United States Patent [19]

Erickson et al.

[11] Patent Number: 5,539,488
[45] Date of Patent: Jul. 23, 1996

[54] ROTARY SHUTTER

[75] Inventors: Paul Erickson, Prior Lake; David Shelander, Roseville; Paul Richardson, Bloomington; John Evers, Fridley, all of Minn.

[73] Assignee: Lucht, Inc., Bloomington, Minn.

[21] Appl. No.: 403,228

[22] Filed: Mar. 16, 1995

[51] Int. Cl.⁶ .................................................. G03B 15/02
[52] U.S. Cl. ............................................ 324/129; 354/154
[58] Field of Search ................................... 354/129, 136, 354/154, 164, 165, 180, 206, 216

[56]  References Cited

U.S. PATENT DOCUMENTS

| | | |
|---|---|---|
| 1,932,691 | 10/1933 | Cole . |
| 3,429,247 | 2/1969 | Rice . |
| 3,504,612 | 4/1970 | Lyle . |
| 3,535,995 | 10/1970 | Ball . |
| 3,630,137 | 12/1971 | Stimson et al. . |
| 3,735,687 | 5/1973 | Park . |
| 4,626,094 | 12/1986 | Saito ........................................ 354/456 |
| 4,669,841 | 6/1987 | Kaneko et al. ......................... 352/216 |
| 4,743,108 | 5/1988 | Vogel et al. . |
| 5,137,346 | 8/1992 | Sattler et al. . |

*Primary Examiner*—Monroe H. Hayes
*Attorney, Agent, or Firm*—Nawrocki, Rooney & Sivertson, P.A.

[57]  ABSTRACT

A rotary shutter for controlling an optical path and including a rotating disk having an opening. A sensor monitor is representative of disk rotation, while a blocking element is selectively positioned within and without the optical path dependent upon the angular position of the disk and the desire to expose the light sensitive medium.

23 Claims, 9 Drawing Sheets

ROTARY SHUTTER

BACKGROUND OF THE INVENTION

The present invention relates to rotary shutters. In particular, the present invention relates to a high-speed rotary shutter for a camera.

A camera generally consists of a housing containing a light-sensitive film, a lens system, a shutter system and a film advance mechanism. Before an object is exposed on the light sensitive film, the film exposure area, shutter and lens are all in optical alignment along an optical path. When the camera is activated, the shutter is opened enabling a completed optical path between the object and the exposure area on the light sensitive film. After exposure, the shutter closes and the film is advanced. In some instances, a mirror moves in and out of the optical path to selectively direct an image to a viewing screen and to move out of the exposure path during film exposure.

A camera shutter functions to admit light rays to the film for a controlled—and usually very brief—period of time, momentarily exposing the object on the film. Shutter opening time may be varied, depending on the amount of exposure desired.

Two types of shutters commonly used in the camera industry are leaf shutters and focal plane shutters. Leaf shutters include a number of thin steel plates, known as shutter leaves, which rotate about pivot points in such a way that when they are rotated outward they admit light rays to the film, and when they are rotated inward, the shutter is closed blocking light rays to the film. Leaf shutters have an relatively high shutter speed and have the ability to be synchronized with the camera flash. Due to the number of moving parts, leaf shutters are inherently maintenance prone.

Focal plane shutters include two roller blinds which move in the same set of tracks. Upon activation, the first blind, covering the film, is rolled across the film onto a spool. Next, the second blind rolls across the film at the same speed and covers the film again. Together the two blinds form a slit which travels across the film gate. For long exposure times, the second blind waits a relatively long time before following the first blind. For short exposures the second blind will quickly follow the first, resulting in a very narrow moving slit. Focal plane shutters operate at higher speeds than leaf shutters. Similar to leaf shutters, focal plan shutters are high maintenance shutters, requiring regular cleaning, maintenance, and lubrication.

Commercial photography often requires taking hundreds of pictures a day, making it necessary to use highly reliable cameras. Additionally, the photos are taken in various ambient light environments which require very fast shutter speeds. Often, conditions require that the camera shutter speed must be as short as possible, but still be able to strobe synchronize with the camera flash to compensate for various deficient ambient light environments.

Rotary shutters have been developed for exposing an area of film at high speeds. These shutters are well known for their use in the motion picture industry. Typically, a motion picture camera uses a continuously revolving shutter having a slit. The film is exposed on each revolution as the slit crosses the film exposure area. Upon each slit revolution, the film is advanced to a new exposure area before the slit crosses the film exposure area again, avoiding multiple exposures or blurring.

Lyle, U.S. Pat. No. 3,504,612, suggests a high-speed shutter. The Lyle device includes a rotary shutter with a slit for quickly exposing a large area of film through the slit, and then keeping the opening closed as the rotary shutter revolves and the film is advanced. The high-speed shutter includes a number of cams and gears, wherein a cam follower opens a slit cover on the rotary shutter on every fourth rotation of the cam wheel. The number of exposures and exposure time may vary, being dependent upon the speed of the cam wheel and ratio between the gears driving the cam-wheels.

Park, U.S. Pat. No. 3,735,687, suggests a rotary shutter. The Park rotary shutter includes a number of disks having openings, the disks being rotated at different speeds. The disk openings become aligned with the camera aperture on multiple revolutions of the disks for operation of the camera at slower speeds.

SUMMARY OF THE INVENTION

The present invention relates to rotary shutters. In particular, the present invention relates to a high-speed rotary shutter for a camera.

The rotary shutter of the present invention is for admitting light rays to complete an optical path and for exposing an object on a light-sensitive film. In a preferred embodiment, the rotary shutter includes a rotating disk having an opening which passes through the optical path. A control system controls the operation of the shutter. A blocking mechanism responds to the control system for selectively blocking the optical path. The blocking mechanism moves to an unblocking position within a desired period of time.

The control means may include a microprocessor. Additionally, the control system may include a sensing mechanism for providing an input signal to the control system representative of disk rotation. The control system may selectively vary the speed of disk rotation.

In one embodiment, the rotary shutter further includes a strobe mechanism responsive to the control system for synchronized strobing of the object. The object is strobed when the rotating disk opening is in the optical path, and when the blocking mechanism is in an unblocking position.

In another embodiment, the present invention includes a camera system having a rotary shutter. The rotary shutter is for admitting light rays to complete an optical path and for exposing an object on a light-sensitive film.

The camera system includes a control system for controlling operation of the camera. A rotatable disk having an opening is included which passes through the optical path upon rotation. A sensing mechanism provides the control system with an input signal representative of disk rotation. A blocking mechanism is responsive to the control system for selectively blocking the optical path. The disk is responsive to the control system for selectively varying the speed of the disk rotation.

A mirror mechanism may be located next to the rotating disk. The mirror mechanism is responsive to the control system for positioning and focusing the camera on the object. The mirror is selectively moveable out of the optical path within a desired period of time.

The control system may include an activation mechanism for selectively providing an input signal to the control system. The control system is responsive to the activation mechanism input signal, and upon detection of the next disk rotation signal, moves the blocking mechanism to an unblocking position within a desired period of time.

Camera shutter speed is programmably adjustable. The disk opening may be generally pie shaped or generally slit shaped and the disk may be rotated at a selected constant speed.

The present invention also includes a method of admitting light rays to complete an optical path and for exposing an object on a light sensitive film. The method includes the steps of first providing a control system. Next, rotating a disk at a desired speed. The disk has an opening which passes through the optical path. Finally, providing a mechanism responsive to the control system for selectively blocking the optical path.

BRIEF DESCRIPTION OF THE DRAWINGS

In the drawings, like reference numerals indicate corresponding parts or elements of the present invention throughout the several views.

DETAILED DESCRIPTION OF THE PREFERRED EMBODIMENTS

The present invention includes a rotary shutter for use with a camera. The rotary shutter is for admitting light rays to complete an optical path and for exposing an object on a light sensitive film. The camera shutter of the present invention provides a high speed durable shutter system which is suitable for commercial uses requiring large numbers of pictures to be taken in a day.

Figure 1:
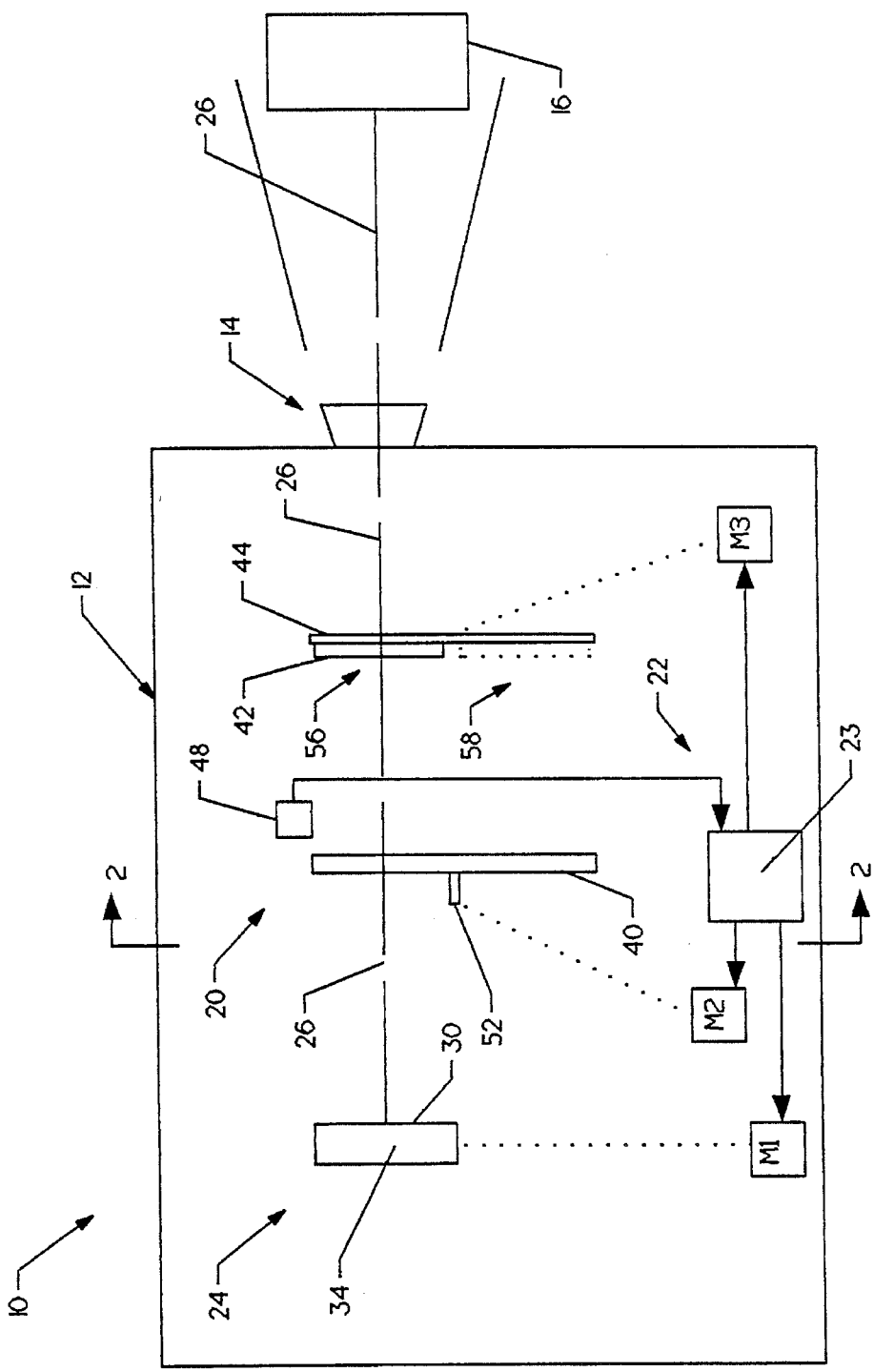
FIG. 1 is a diagrammatic view of a camera system including a first embodiment of a rotary shutter system in accordance with the present invention.

FIG. 1 shows a camera system generally at 10 having a housing 12. A lens system 14 extends through housing 12 for focusing upon an object 16. Contained within housing 12 is a rotary shutter system 20, a control system 22, and a film advance system 24. Rotary shutter system 20, film advance system 24, and lens system 14 are aligned within an optical path 26.

Control system 22 controls operation of the camera 10. Control system 22 includes a controller 23. In a preferred embodiment, controller 23 includes a microprocessor. Controller 23 may consist of other devices capable of performing a sequence of logical operations, such as a computer or network of logic gates.

Film advance system 24 (shown from a side view) includes a light sensitive film 30 extending between a pair of film reels 34. Film 30 includes a succession of film exposure areas (not shown). Film advance motor M1 is mechanically coupled to the film reels 34 for advancing film 30.

Figure 2:
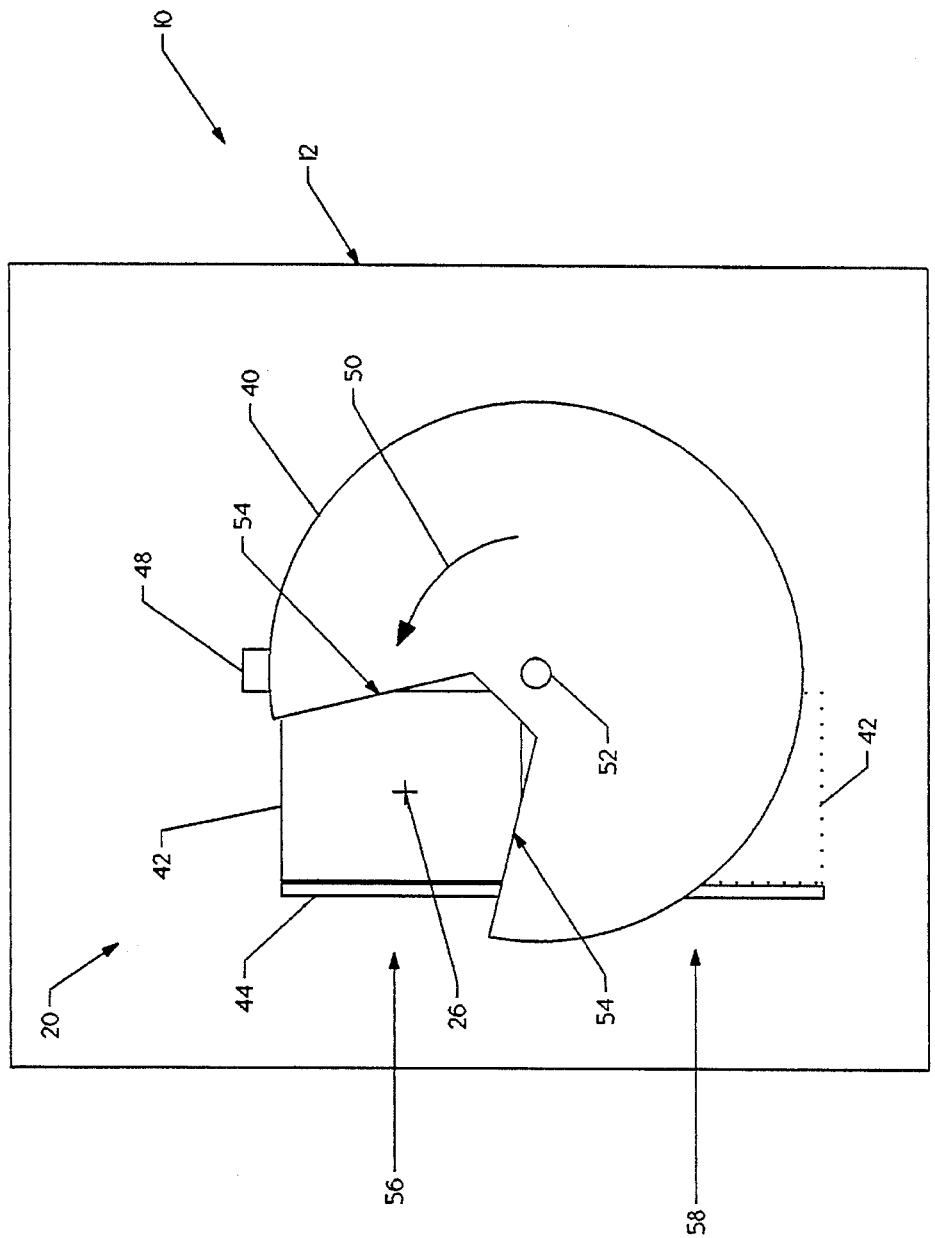
FIG. 2 is a sectional view of the rotary shutter system taken along line 2—2 of FIG. 1.

Rotary shutter system 20 allows optical path 26 to be selectively completed for exposing an object 16 on light-sensitive film 30. FIG. 2 is a sectional view of rotary shutter system 20 taken along line 2—2 of FIG. 1. Rotary shutter system 20 includes a disk 40, a disk motor M2, a flag 42, a shaft 44, a flag motor M3, and sensor 48.

Disk motor M2 is mechanically coupled to disk 40 through axis 52. Flag motor M2 is electrically coupled to controller 23. Flag motor M2 is responsive to controller 23 for rotating disk 40 about axis 52 at a desired speed, as indicated by rotation arrow 50 in FIG. 2.

Rotating disk 40 is located such that it crosses optical path 26. Rotating disk 40 includes an opening 54. Opening 54 is positioned on rotating disk 40 to pass through optical path 26 on each rotation.

In a preferred embodiment, opening 54 is generally pie shaped as shown in FIG. 2. It is recognized that opening 54 may take on numerous shapes, such as that of a slit or circle.

Flag 42 is movably attached to shaft 44, and mechanically coupled to flag motor M3. Flag motor M3 is responsive to controller 23 for moving flag 42 between a blocking position 56 and an unblocking position 58 within a desired period of time. Flag 42 may take on many shapes and forms, and is generally sized larger than the opening on rotating disk 40. In a preferred embodiment, flag 42 is generally rectangular shaped.

When flag 42 is in the blocking position 56, it blocks optical path 26. In the blocking position, even though disk 40 opening 54 is in alignment with optical path 26 upon each disk rotation, optical path 26 is still blocked by flag 42. Since optical path 26 is blocked by flag 42, object 16 may not be exposed on film exposure area of film 30.

Sensor 48 is located adjacent to disk 40. Sensor 48 senses each rotation of disk 40. Sensor 48 provides an input signal to controller 23 representative of disk 40 rotation. In one embodiment, sensor 48 has an optical sensor located at the leading edge of opening 54.

Controller 23 controls the operation of camera 10, including shutter system 20 and film advance system 24. Controller 23 enables film advance motor M1 to advance film 30 to the next film exposure area 32. Upon activation of camera 10, controller 23 receives the next disk rotation input signal from sensor 48. Controller 23 enables flag motor M3 to move flag 42 from a blocking position 56 to a unblocking position 58 within one disk 40 rotation. When opening 54 passes through optical path 26 on the next disk 40 rotation, object 16 is exposed on film 30.

The rotary shutter system 20 of the present invention is a high-speed shutter system. Films may be exposed at very high speeds, with exposure times being dependent upon the rotational speed of disk 40, the size of opening 54, and the movement of flag 42. The faster the rotation of disk 40, the shorter the exposure time for film 32. It is recognized that disk motor M2 may rotate disk 40 at a preset speed. Alternatively, disk motor M2 may be a two-speed motor or a variable speed motor. Through the use of a variable speed drive, the speed of disk 40 may be selectively varied by controller 23.

Additionally, the exposure time for film 32 is dependent on the size of the opening 54. A larger opening results in a longer exposure time, and a smaller opening, such as a slit, will result in a shorter exposure time. Opening 54 size may be changed by changing out disk 40, or by providing a variable slit mechanism on disk 40. The slit mechanism could be coupled to controller 23 of selectively varying the size of opening 54.

Lastly, by controller 23 controlling the position of flag 42, the period of time between exposures may be varied by selectively moving flag 42 between a blocking position and an unblocking position.

Figure 3:
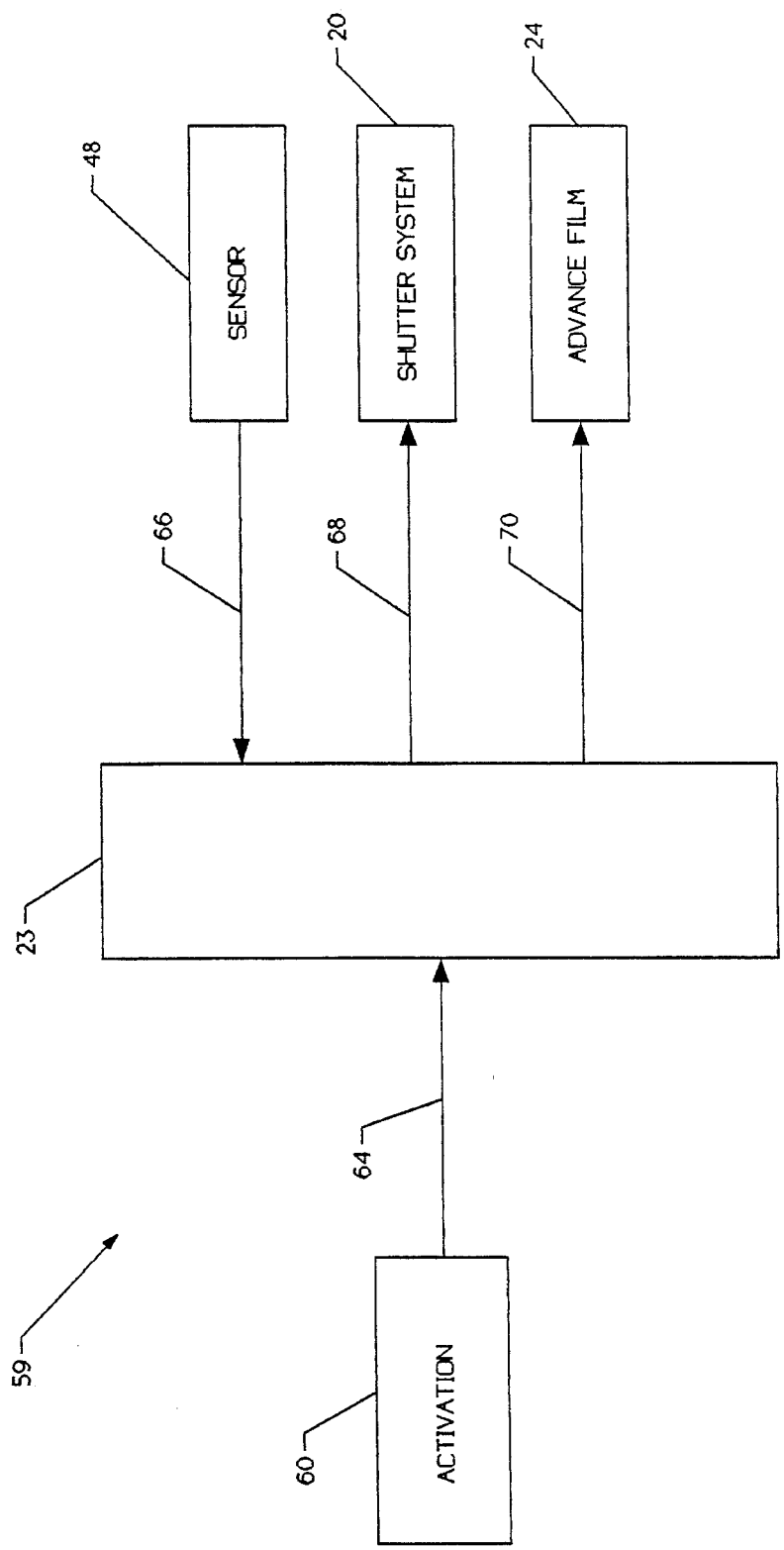
FIG. 3 is a control block diagram of the rotary shutter of FIG. 1.

FIG. 3 is a control block diagram of one embodiment of the present invention. Activation 60, sensor 48, rotary shutter system 20 and film advance system 24 are all electrically coupled to controller 23. Controller 23 receives an input signal 64 from activation 60 for notifying controller 23 to expose object 16 on film 30, and subsequently rotary shutter system 20 is to be activated. Sensor 48 provides an input signal 66 to controller 23 representative of disk 40 rotation. Controller 23 provides an output signal 68 to rotary shutter system 20. Additionally, controller 23 provides an output signal 70 to film advance system 24.

Figure 5:
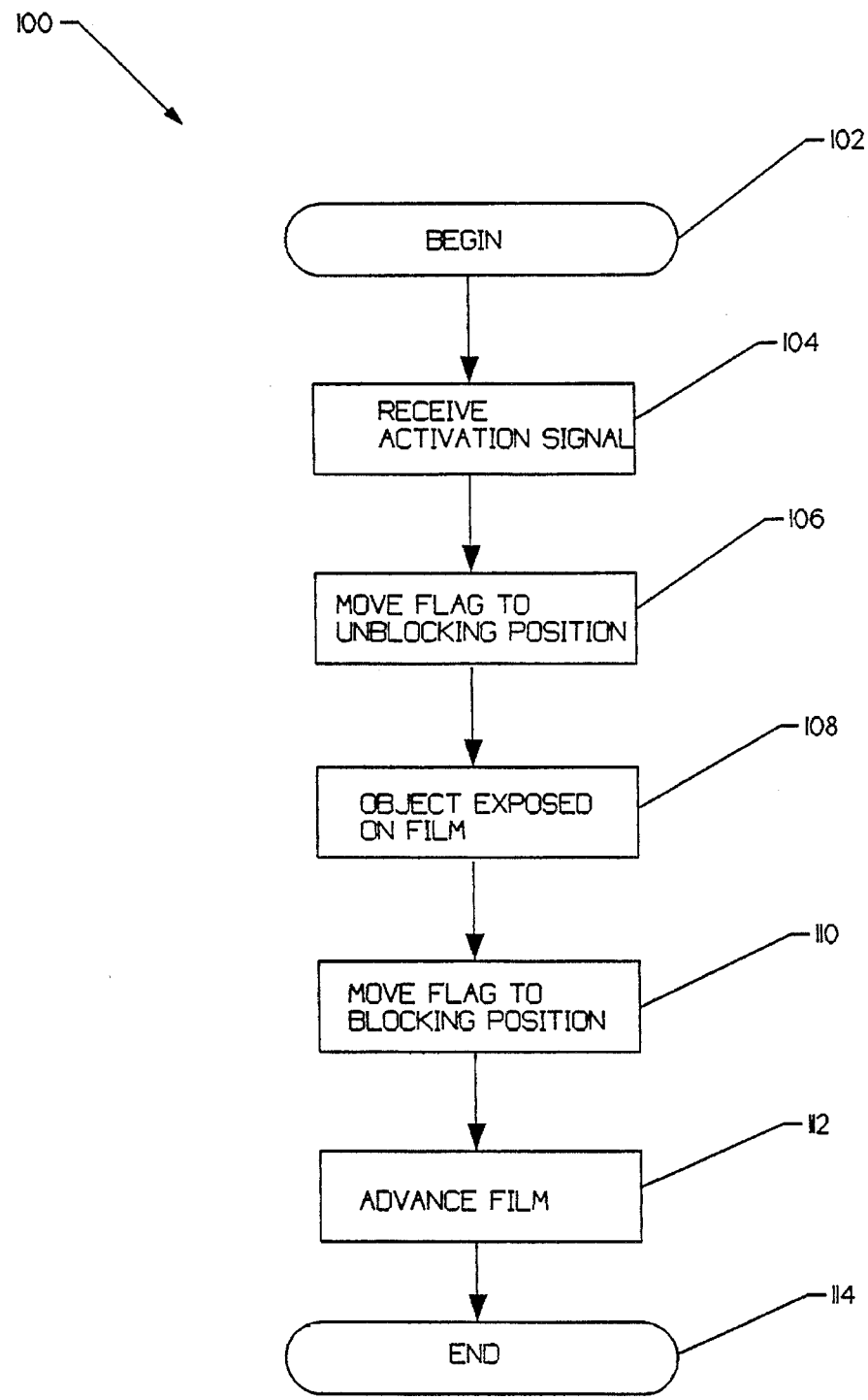
FIG. 5 is a flow diagram of the rotary shutter of FIG. 1.

FIG. 5 is a timing diagram illustrating the relative signal timing of the present invention embodiment shown in FIG. 3. The timing diagram is shown generally at 70. Graph 72 represents the position of flag 42. Graph 74 represents sensor 48 input signal to controller 23, which is representative of disk 40 rotation. Time marks 76 represent the time period between each sensed disk rotation. Flag 42 blocking position 56 is indicated at level 78, and unblocking position 58 is indicated at level 80.

At time 82, an activation input signal 64 is received by controller 23. At time 84, the next disk rotation input signal 66 is received by controller 23. At that time, disk 40 opening 54 has just passed through optical path 26. Flag 42 begins to move from a blocking position 56 to an unblocking position 58 (level 80) within one disk rotation. At time 86, flag 42 is in an unblocking position 58, out of optical path 26.

At time 88, opening 54 is passing through optical path 26, and flag 42 is in an unblocking position 58 allowing object 16 to be exposed on film 30. At time 90, opening 54 has passed through optical path 26, and flag 42 begins to move from an unblocking position 58 to a blocking position 56 within one disk rotation. At time 92, flag 42 has returned to a blocking position 56, until the next input signal 68 is received from controller 23.

FIG. 5 is a flow diagram of one embodiment of the present invention. The flow diagram is generally shown at 100. The flow diagram begins at 102 with disk 40 rotating, and flag 42 being located in a blocking position 56 across optical path 26. An activation signal 64 is received by controller 23 (104). Upon receiving the next disk rotation input signal 66 from sensor 48, controller 23 provides an output signal 68 to move flag 42 to an unblocking position (106). As indicated in the timing diagram in FIG. 4, flag 42 is moved to an unblocking position within one disk rotation.

Since flag 42 no longer blocks optical path 26, the next time opening 54 passes through the optical path 26, object 16 is exposed on film 30 (108). As opening 54 passes through optical path 26, sensor 48 once again provides controller 23 with a disk rotation input signal 66. At that time, as shown on FIG. 4, controller 23 provides an output signal 68 to move flag 42 to a blocking position 56 (110). Once flag 42 has returned to a blocking position 56, controller 23 provides an output signal 70 to advance film 30 to the next exposure area 32 (112). The process of exposing object 16 on film 30 is now complete (114).

Figure 6:
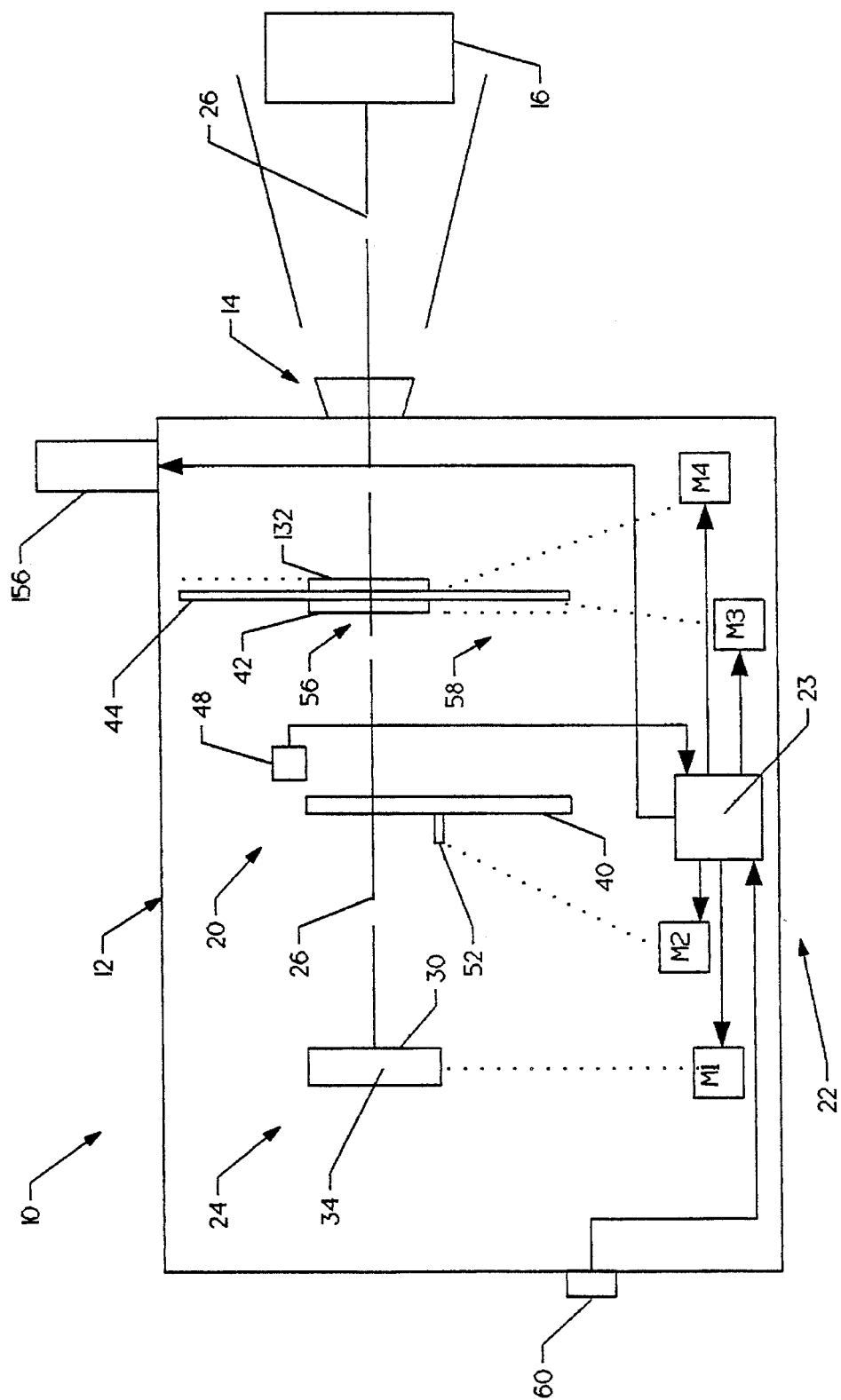
FIG. 6 is a diagrammatic view of a camera system using a second embodiment of a rotary shutter system in accordance with the present invention.

FIG. 6 is a diagrammatic view of a preferred embodiment of the present invention. The embodiment shown in FIG. 6 is the same as the invention embodiment shown in FIG. 1, and includes an activation system 60, a mirror 132, a mirror motor M4, and strobe system 156.

Activation system 60 is electrically coupled to controller 23. Activation system 60 may be a button mechanism or other control device commonly used by the photography industry. Activation system 60 provides an input signal to controller 23, notifying controller 23 that it is desired that object 16 be exposed on film 30.

Mirror 132 allows the camera user to position and focus object 16 in preparation of exposing object 16 on film 30. Mirror 132 is movably attached to shaft 44. Mirror motor M4 is mechanically coupled to mirror 132 and is electrically coupled to controller 23. In operation, mirror 132 is located in a blocking position across optical path 26. Lens system 14 directs an image of object 16 to mirror 132 which reflects that image to a viewing screen (not shown), in a known manner. When it is desired that the image of object 16 be exposed on film 30, controller 23 provides an output signal to mirror motor M4. Mirror motor M4 moves mirror out of optical path 26 to an unblocking position within a desired period of time.

Strobe system 156 is coupled to controller 23. Strobe system 156 provides synchronized strobing of object 16 to compensate for deficient ambient light situations.

Figure 7:
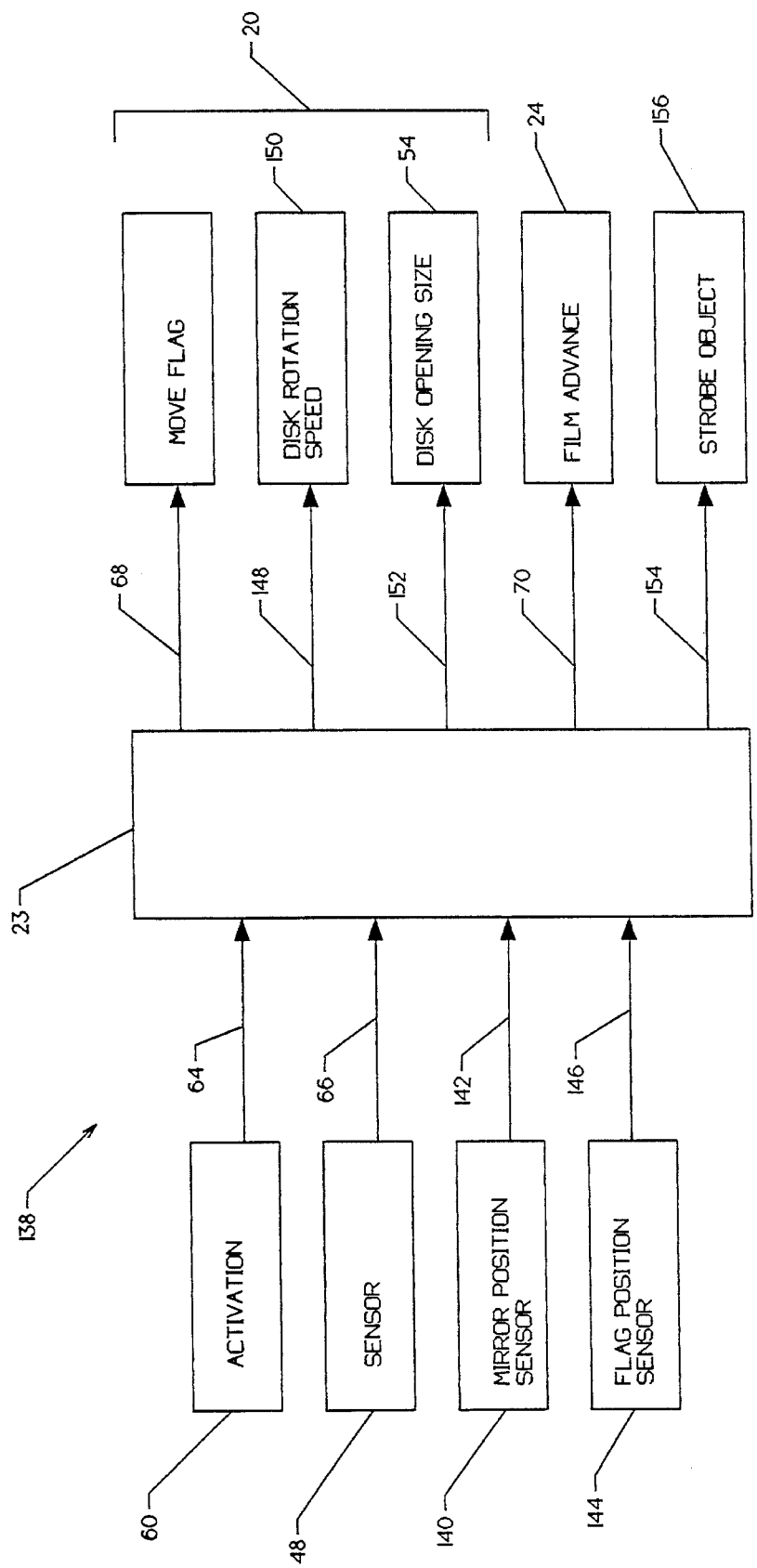
FIG. 7 is a control block diagram of the rotary shutter system shown in FIG. 6.

FIG. 7 is a control block diagram of a preferred embodiment of the present invention. Similar to FIG. 3, FIG. 7 includes controller 23 having a plurality of input and output signals. As previously indicated in FIG. 3, controller 23 receives input signals from activation system 60 and sensor 48, and provides output signals to shutter system 20 for moving flag 42 and to film advance system 24.

Additionally, numerous input control signals may be provided to controller 23 to aid in operation of the camera system 10. For example, a mirror position sensor 140 may provide an input signal 142 to controller 23 representative of the position of mirror 132. A flag position sensor 144 may be located on shaft 44 which provides an input signal 146 to controller 23 representative of the position of flag 42.

Also, controller 23 may provide various other control signals to rotary shutter system 20. For example, an output signal 148 may be provided to control or change disk rotation speed 150, or an output signal 152 may be output to shutter system 20 to change the size of the shutter opening 54. Controller 23 may provide numerous other output signals for other camera systems which work in conjunction with rotary shutter system 20. For example, an output signal 154 may be output to strobe system 156 for synchronous strobing of object 16.

Figure 4:
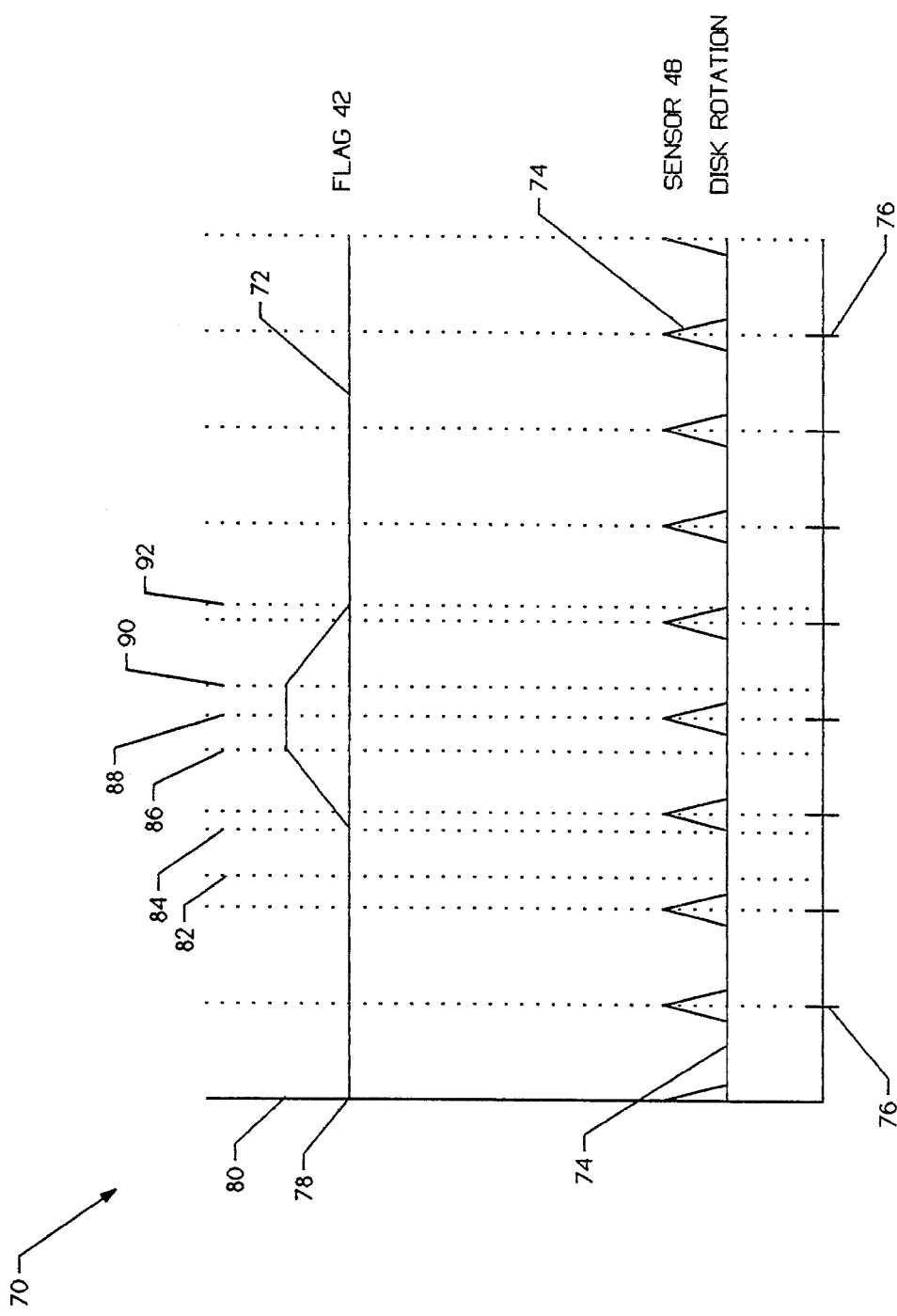
FIG. 4 is a timing diagram of the rotary shutter of FIG. 1.
Figure 8:
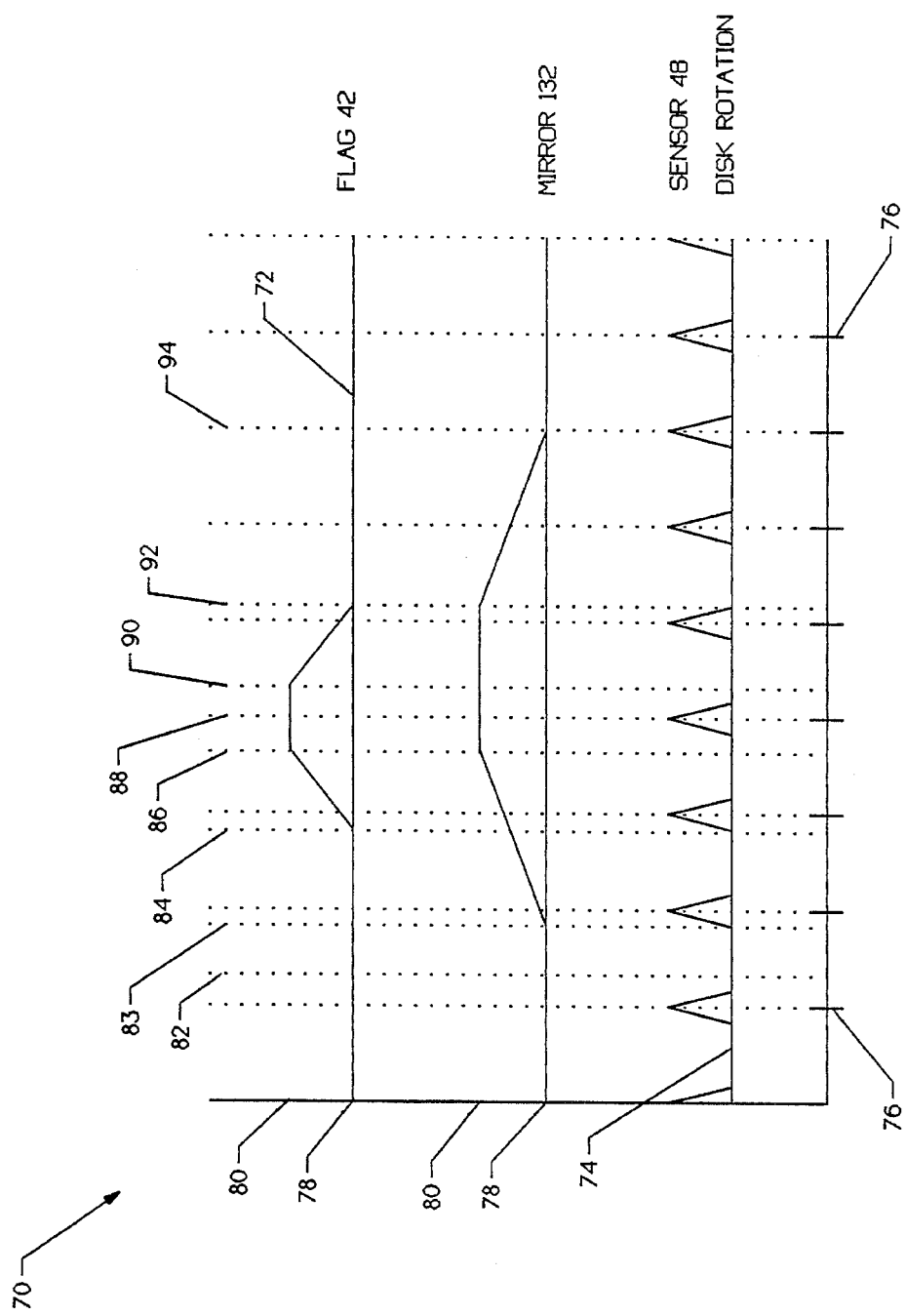
FIG. 8 is a timing diagram of the rotary shutter system shown in FIG. 6.

FIG. 8 is a timing diagram similar to FIG. 4, including the timing of mirror 132 and strobe system 156. An activation signal 64 is received by controller 23 at time 82. After receiving the next input signal 66 from sensor 48 at time 83, controller 23 begins to move mirror 132 to an unblocking position (80). Mirror 132 moves to an unblocking position within two disk rotations. Upon receiving the next sensor 48 input signal 66 at time 84, flag 42 begins to move out of optical path 26 within one disk rotation.

At time 88, both mirror 132 and flag 42 are located in an unblocking position. Disk opening 54 passes through optical path 26, allowing a completed optical path between object 16 and film 30 at time 88. At this time, object 16 may be synchronously strobed to provide additional light rays for exposing object 16 on film 30 to compensate for poor ambient light conditions.

At time 92, flag 42 has returned to a blocking position, and mirror 132 begins to move to a blocking position within two disk 48 rotations. At time 94, mirror 132 has returned to a blocking position.

As an alternative to the technique described with reference to FIG. 8, flag movement may begin after a fixed delay following an input signal 66 from the sensor 48, the same signal that initiates movement of mirror 132. In this technique, the same signal begins the move sequence of both mirror 132 and flag 42.

Figure 9:
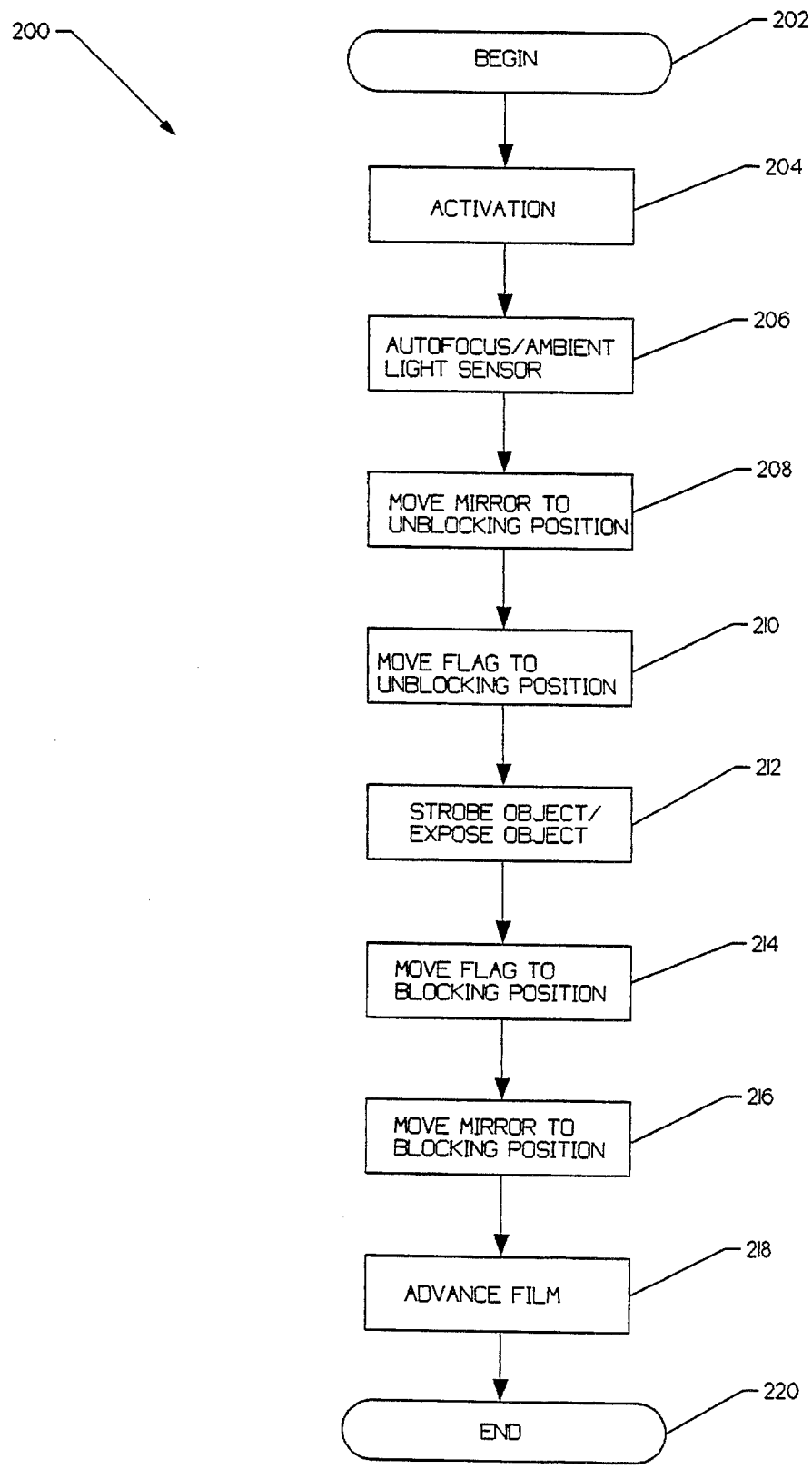
FIG. 9 is a flow diagram of the rotary shutter system shown in FIG. 6.

FIG. 9 shows an operational flow diagram of a preferred embodiment of the present invention generally at 200. The operation begins with disk 40 rotating at a desired speed, and flag 42 and mirror 132 located in a blocking position across optical path 26 (202). Next, an activation signal 64 is provided to controller 23 (204). Additionally, other inputs may be provided to controller 23 at this time, such as the sensing of ambient light present, or auto focusing of object 16 on a viewing screen via mirror 132 (206).

Upon receiving the next sensor 48 disk rotation input signal 66, controller 23 begins to move mirror 132 to an unblocking position (208). Upon receiving the next sensor 48 input signal 66 (or alternatively, after a fixed time following the signal that initiates the mirror movement), flag 42 is moved to an unblocking position (210). When both flag 42 and mirror 132 are in an unblocking position, and opening 54 passes through optical path 26, object 16 is exposed on film 30. At this time, object 16 may be strobed to compensate for ambient light deficiencies.(212).

Flag 42 is then moved to an unblocking position within one disk 40 rotation (214), and mirror 132 is moved to a blocking position within two disk rotations (216). Finally, film 30 may be advanced to the next exposure area (218) and the operation of exposing object 16 on film 30 is complete (220).

The rotary shutter system of the present invention is a high-reliability shutter with an inherently fast shutter speed. Additionally, the shutter may be used in camera systems which require limited space constraints. For example, the shutter may be used with a zoom lens which requires an inherently shallow back focus.

The rotary shutter of the present invention provides a durable shutter which may be used in commercial photography which requires taking hundreds of pictures a day. The shutter may be strobe synchronized with a camera flash to compensative for deficient ambient light environments.

It will be understood that this disclosure is, in many respects, only illustrative. Changes may be made in details, particularly in matters of shape, size, and arrangement of parts, without exceeding the scope of the invention. Accordingly, the scope of the invention is defined in the language of the appended claims.

What we claim is:

1. A rotary shutter for admitting light rays to complete an optical path and for exposing an object on a light sensitive film, the shutter comprising:

a rotating disk having an opening which passes through the optical path;

control means for controlling operation of the shutter;

sensing means for providing an input signal to the control means representative of disk rotation; and means responsive to the control means for selectively blocking the optical path to the film.

2. The rotary shutter of claim 1, further including strobe means responsive to the control means for synchronized strobing of the object when the rotating disk opening is in the optical path and when the blocking means is in an unblocking position.

3. The rotary shutter of claim 1, wherein the control means may selectively vary the speed of disk rotation.

4. The rotary shutter of claim 1, wherein the means for selectively blocking the optical path is moved between a blocking position and an unblocking position within a desired period of time.

5. The rotary shutter of claim 1, wherein the control means includes a microprocessor.

6. A camera system having a rotary shutter, the shutter for admitting light rays to complete an optical path and for exposing an object on a light sensitive film, the system comprising:

a rotatable disk having an opening which passes through the optical path upon rotation;

control means for controlling operation of the camera;

sensing means for providing the control means with an input signal representative of disk rotation; and blocking means responsive to the control means for selectively blocking the optical path.

7. The camera system of claim 6, further comprising strobe means responsive to the control means for synchronized strobing of the object.

8. The camera system of claim 6, wherein the disk is responsive to the control means for selecting the speed of disk rotation.

9. The camera system of claim 6, further comprising mirror means responsive to the control means for positioning and focusing the camera on the object, the mirror means being movably located within the optical path and being selectively movable out of the optical path.

10. The camera of claim 9, wherein the mirror is selectively moveable out of the optical path within a desired period of time.

11. The camera of claim 6, wherein the blocking means includes a blocking position and an unblocking position, the blocking means being movable between the blocking position and the unblocking position within a desired period of time.

12. The camera system of claim 6, wherein the control means includes an activation means for selectively providing an input signal to the control means, wherein the control means is responsive to the activation means input signal, whereupon detection of the next disk rotation signal the blocking means is moved from a blocking position within a desired period of time.

13. The camera of claim 12, wherein the desired period of time is adjustable.

14. The camera of claim 6, wherein the blocking means includes a generally flag shaped member for blocking the optical path.

15. The camera of claim 6, wherein the disk opening size is adjustable.

16. The camera of claim 6, wherein the disk opening is generally pie shaped.

17. The camera of claim 6, wherein the disk opening is generally slit shaped.

18. The camera of claim 6, wherein the disk is rotated at a constant speed.

19. The camera of claim 6, wherein the disk rotation speed is selectable.

20. The camera of claim 6, wherein the control means includes a microprocessor.

21. The camera of claim 6, wherein the control means includes a variable speed drive for varying the speed of disk rotation.

22. A method of admitting light rays to complete an optical path and for exposing an object on a light sensitive film, the method comprising the steps of:

providing a control means for controlling operation of the method;

rotating a disk at a desired speed, the disk having an opening which passes through the optical path; and providing a means responsive to the control means for selectively blocking the optical path to the film.

23. The method of claim 22, wherein the control means includes a sensing means for providing the control means with an input signal representative of sensed disk rotation.

* * * * *